(12) United States Patent
Sugimoto et al.

(10) Patent No.: US 7,507,895 B2
(45) Date of Patent: Mar. 24, 2009

(54) ELECTRONIC MUSICAL INSTRUMENT

(75) Inventors: Ryotaro Sugimoto, Shizuoka (JP); Takeshi Ando, Hamamatsu (JP); Seiji Abe, Hamamatsu (JP); Shinya Sakurada, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 128 days.

(21) Appl. No.: 11/515,109

(22) Filed: Aug. 31, 2006

(65) Prior Publication Data

US 2007/0051223 A1 Mar. 8, 2007

(30) Foreign Application Priority Data

Sep. 1, 2005 (JP) .............................. 2005-253914

(51) Int. Cl.
*G10H 1/00* (2006.01)
(52) U.S. Cl. .................... 84/600; 84/3; 84/615; 84/653
(58) Field of Classification Search ........................ None
See application file for complete search history.

(56) References Cited

U.S. PATENT DOCUMENTS

| | | | |
|---|---|---|---|
| 2005/0130717 A1* | 6/2005 | Gosieski et al. | 455/575.2 |
| 2006/0243123 A1* | 11/2006 | Ierymenko | 84/742 |
| 2007/0188144 A1* | 8/2007 | Hara et al. | 320/132 |

* cited by examiner

*Primary Examiner*—Marlon T Fletcher
(74) *Attorney, Agent, or Firm*—Morrison & Foerster LLP

(57) ABSTRACT

Fuel battery generates electric power using a predetermined fuel, and activation and deactivation of the electric power generation can be controlled in accordance with whether or not the fuel should be supplied to the fuel battery. The electric power is supplied to individual circuits/devices of a tone generation section, so that a tone is generated by any of the circuits/devices operating in response to operation of a performance operator unit. The circuits/devices are allowed to electrically operate for a long time with the electric power supplied by the fuel battery. In this way, an electronic musical instrument using the fuel battery can operate for a long time as compared to the conventional electronic musical instruments using a dry battery or storage battery (secondary battery).

4 Claims, 3 Drawing Sheets

ELECTRONIC MUSICAL INSTRUMENT

BACKGROUND OF THE INVENTION

The present invention relates to electronic musical instruments for electrically generating tones by driving various circuits, devices, etc. with electric power supplied from a power supply, and more particularly to electronic musical instruments which drive various circuits, devices, etc. by a battery.

Recently, electronic musical instruments, which are arranged to electrically generate tones while simulating performance styles of natural musical instruments (i.e., so-called "acoustic musical instruments"), such as a piano, organ, trumpet and guitar, have been widely used in place of the natural musical instruments. In these electronic musical instruments, an electric power supply is required for supplying electric power (voltage/current) to various electrically-operable circuits, devices, etc., such as a tone generator circuit, amplifier, speaker and other electronic devices, to drive these various circuits, devices, etc. Particularly, there have been known portable, small-sized and lightweight electronic musical instruments which can use a battery as the power supply. Manganese-type dry batteries are normally used in the conventionally-known portable, small-sized and lightweight electronic musical instruments. In recent years, however, it has become possible to use (re)chargeable storage batteries (secondary batteries), such as nickel-cadmium, nickel-hydrogen and lithium ion batteries. One example of such an electronic musical instrument is disclosed in Japanese Patent Application Laid-open Publication No. 2002-207480.

As noted above, some conventionally-known electronic musical instruments can use a dry battery or chargeable storage battery (secondary battery) as the power supply for driving various circuits, devices, etc. of the electronic musical instrument. However, in the case where a dry battery is used, the capacity of the dry battery is insufficient to drive the electronic musical instrument for a long time, and thus, the user has to prepare in advance many dry batteries and frequently change the dry batteries, which tends to be very cumbersome. In the case where a storage battery (secondary battery) is used, on the other hand, there can be achieved the advantage that the storage battery is greater in capacity than the dry battery and can thereby drive the electronic musical instrument for a longer time. However, because the storage battery requires a separate charging power supply (e.g., power supply of 100 V) and the charging requires a considerable time, it is not possible to readily charge and reuse the storage battery outdoors where such a charging power supply can not be readily secured. Therefore, in the case where the storage battery is used, the electronic musical instrument can be used only in limited places, which would result in poor user-friendliness and usability of the electronic musical instrument.

SUMMARY OF THE INVENTION

In view of the foregoing, it is an object of the present invention to provide an improved electronic musical instrument which is powered or driven by a fuel battery so that it can operate (or can be used) for a longer time than conventional electronic musical instruments powered by a dry battery or storage battery.

In order to accomplish the above-mentioned object, the present invention provides an improved electronic musical instrument, which comprises: a performance operator unit; a tone generation section that includes a plurality of electrically-operable circuits/devices and generates a tone by any of the circuits/devices operating in response to operation of the performance operator unit; and a fuel battery that generates electric power using a predetermined fuel, activation and deactivation of electric power generation by the fuel battery being capable of being controlled in accordance with whether or not the fuel should be supplied to the fuel battery. The fuel battery allows the circuits/devices to electrically operate by supplying the electric power to the individual circuits/devices of the tone generation section.

According to the present invention, the fuel battery generates electric power using the predetermined fuel, and the activation and deactivation of the electric power generation by the fuel battery can be controlled in accordance with whether or not the fuel should be supplied to the fuel battery. The electric power is supplied to the individual circuits/devices of the tone generation section, so that a tone is generated by any of the circuits/devices operating in response to operation of the performance operator unit. The circuits/devices are allowed to electrically operate for a long time with the electric power supplied by the fuel battery. In this way, the electronic musical instrument of the invention using the fuel battery can operate for a long time as compared to the conventional electronic musical instruments using a dry battery or storage battery (secondary battery).

With the arrangement that the circuits/devices of the electronic musical instrument are caused to operate with the electric power supplied by the fuel battery, the electronic musical instrument of the invention using the fuel battery can advantageously operate for a long time as compared to the conventional electronic musical instruments using a dry battery or storage battery.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIGS. 4A and 4B are diagrams showing examples of relationship between variations in a remaining capacity of a storage battery and in output electric power of the fuel battery, of which FIG. 4A shows the relationship in a low load condition while FIG. 4B shows the relationship in a high load condition.

DETAILED DESCRIPTION OF THE INVENTION

Figure 1:
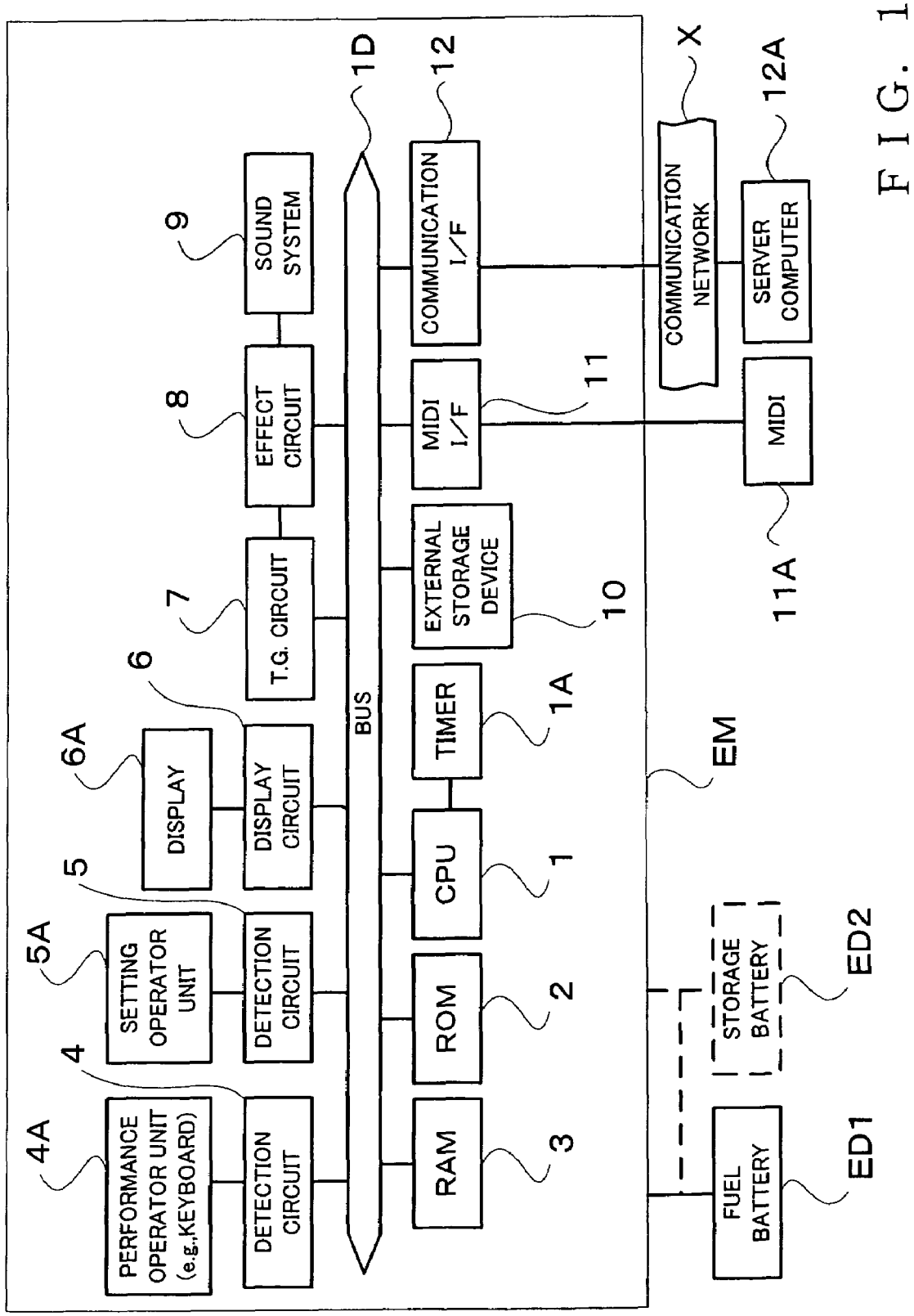
FIG. 1 is a block diagram illustrating a general hardware setup of an electronic musical instrument in accordance with an embodiment of the present invention.

FIG. 1 is a block diagram illustrating a general hardware setup of an electronic musical instrument in accordance with an embodiment of the present invention. This electronic musical instrument EM is controlled by a microcomputer comprising a microprocessor unit (CPU) 1, a read-only memory (ROM) 2 and a random-access memory (RAM) 3. The CPU 1 controls behavior of the entire electronic musical instrument. To the CPU 1 are connected, via a data and address bus 1D, the ROM 2, RAM 3, detection circuits 4 and 5, display circuit 6, tone generator (T.G.) circuit 7, effect circuit 8, external storage device 10, MIDI interface (I/F) 11 and communication interface 12. Also connected to the CPU 1 is a timer 1A for counting various time periods and intervals, for example, to signal interrupt timing for timer interrupt processes. For example, the timer 1A generates clock pulses, which are given to the CPU 1 as processing timing instructions or as interrupt instructions. In accordance with such instructions, the CPU 1 carries out various processes, such as an automatic performance based on a manual performance by a human player or performance data, and other conventional processes necessary for the electronic musical instrument EM to function as desired; the conventionally-known processes include, for example, a performance guide process.

The CPU 1 and various circuits, devices, etc., constituting the electronic musical instrument and connected to the CPU 1, are operable by being supplied with electric power (voltage/current) from a fuel battery ED1 (and/or storage battery ED2). Namely, the electronic musical instrument EM is capable of electrically generating tones by appropriately operating the various circuits, devices, etc. through driving by the fuel battery ED1 and/or storage battery ED2, in a case where the electronic musical instrument is of a hybrid power supply construction as will be later detailed. Construction and activation control of the fuel battery ED1 for supplying electric power to the various circuits, devices, etc. will be later described in detail in relation to FIGS. 2-4.

The ROM 2 has prestored therein various programs to be executed by the CPU 1 and various data. The RAM 3 is used as a working memory for temporarily storing various data generated as the CPU 1 executes a predetermined program, as a memory for storing the currently-executed program and data related thereto, and for various other purposes. Predetermined address regions of the RAM 3 are allocated and used as registers, flags, tables, memories, etc. Performance operator unit 4A is, for example, in the form of a keyboard having a plurality of keys for designating pitches of tones to be generated and a plurality of key switches provided in corresponding relation to the keys. The performance operator unit (e.g., keyboard) 4A can be used not only for a manual performance by the human operator but also as means for setting various performance parameters, such as parameters of tone colors and effects, to be used in the electronic musical instrument EM. The detection circuit 4 detects depression and release of the keys on the performance operator unit 4A to thereby produce detection outputs. Setting operator (e.g., switch) unit 5A includes, for example, switches for setting various performance parameters to be used for a manual performance etc., switches for selecting accompaniment performance data to be automatically performed, etc. The setting operator unit 5A may of course include various other operators, such as a numerical-value-data inputting key pad operable to select, set and control a tone pitch, tone color, effect and the like, a character (or letter)-data inputting keyboard and a mouse for manipulating a predetermined pointer displayed on a display 6A. The detection circuit 5 detects operating states of the above-mentioned switches and outputs switch information, corresponding to the detected operating states, to the CPU 1 via the data and address bus 1D.

The display circuit 6 displays, on the display 6A that is, for example, in the form of a liquid crystal display (LCD) panel or CRT, types and current settings of performance parameters, score of a music piece, list of performance data and/or controlling states of the CPU 1. The tone generator circuit 7, which is capable of simultaneously generating tone signals in a plurality of channels, receives, via the data and address bus 1D, various performance information generated in response to human operator's' operation on the performance operator unit 4A (or in response to reproduction of performance data), and it generates tone signals based on the received performance information. The tone signals thus generated by the tone generator circuit 7 are audibly reproduced or sounded via a sound system 9, including an amplifier and speaker, after being imparted with desired effects via the effect circuit 8.

The external storage device 10 is provided for storing various data, such as performance data, and data pertaining to control based on various control programs etc. to be performed by the CPU 1. The external storage device 10 may comprise any of a hard disk (HD) and various removable-type media, such as a flexible disk (FD), compact disk (CD-ROM or CD-RAM), magneto-optical disk (MO) and digital versatile disk (DVD), or a semiconductor memory, such as a flash memory.

The MIDI interface (I/F) 11 is provided for inputting performance data of the MIDI format (i.e., MIDI data) from externally-connected other MIDI equipment 11A or the like to the electronic musical instrument EM, and for outputting performance data of the MIDI format (i.e., MIDI data) from the electronic musical instrument EM to the other MIDI equipment 11A or the like. The other MIDI equipment 11A may be of any type (or operating type), such as the keyboard type, stringed instrument type, wind instrument type, percussion instrument type or body-attachable type, as long as it can generate MIDI data in response to operation by a human operator of the MIDI equipment.

The communication interface (I/F) 12 is an interface connected to a wired or wireless communication network X, such as a LAN, the Internet and/or telephone line network, via which it can be connected to a desired server computer 12A to input various desired control programs and data from the server computer 12A to the electronic musical instrument EM.

Furthermore, the electronic musical instrument EM of the present invention is not limited to the type where the performance operator unit 4A, display 6A, tone generator circuit 7, etc. are incorporated together within the body of the electronic musical instrument EM; for example, the electronic musical instrument EM may be constructed such that the above-mentioned components are provided separately and interconnected via communication facilities, such as a MIDI interface, various networks and/or the like.

Figure 2:
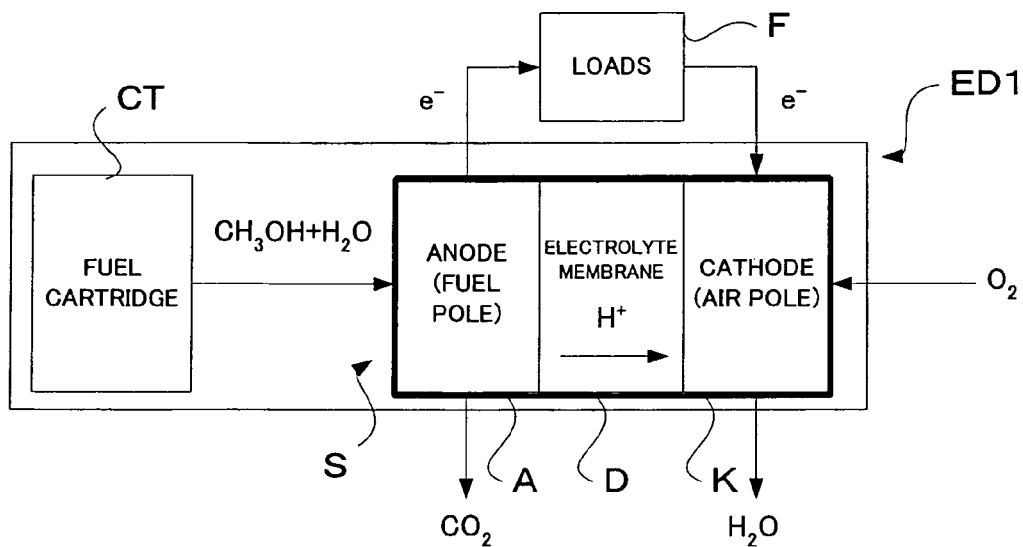
FIG. 2 is a conceptual diagram showing an example of a fuel battery.

As seen in FIG. 1, the electronic musical instrument EM of the present invention is powered and driven by a fuel battery ED1 (and/or storage battery D2) so that various circuits, devices etc. of the musical instrument EM can operate individually. With reference to FIG. 2, a description will be given about the fuel battery ED1 for supplying electric power to the various circuits, devices etc. of the electronic musical instrument EM (or supplying electric power to the storage battery D2 where the electronic musical instrument EM is of a hybrid power supply construction as will be later described). FIG. 2 is a conceptual diagram showing an example of the fuel battery ED1. The following description will be made on assumption that the fuel battery ED1 comprises a plurality of direct methanol fuel cells (DMFC), although the electronic musical instrument EM may of course employ any one of various small-size fuel batteries other than the battery comprising direct methanol fuel cells (DMFCs), such as a battery comprising polymer electrolyte fuel cells (PEFCs). However, the electronic musical instrument EM, which is portable, small-sized and lightweight, preferably employs the direct-methanol (DMFC) type fuel battery as its power supply, because the operating temperature range of the direct-methanol type fuel battery is from a room temperature to about 80° C., which is lower than the operating temperatures of the other types of fuel batteries.

Similarly to the conventional counterparts, the direct-methanol (DMFC) type fuel battery comprises a fuel cartridge CT and a cell stack S. The stack S comprises a plurality of (e.g., dozens of or several hundreds of) cell structures, and each of the cell structures comprises a cathode (so-called "air pole" (+)) K in the form of a carbon electrode with minute catalyst particles, such as platinum or platinum-telnium particles, adhered thereto, and an anode (so-called "fuel pole" (−)) A in the form of a carbon electrode with minute catalyst particles, such as platinum particles, adhered thereto, and a film-shaped electrolyte membrane D is sandwiched between the cathode (air pole (+)) K and the anode (fuel pole (−)) A. In FIG. 2, however, only one such a cell structure is shown to facilitate understanding. The fuel cartridge CT is a cartridge-type fuel supply device detachably attached to the body of the fuel battery including the stack S, and the fuel cartridge CT can be filled with a liquid, such as 6% wt methanol (i.e., methanol solution) obtained by diluting several % to 100% methanol. The methanol solution can be sent from the fuel cartridge CT, attached to the body of the fuel battery, to the anode (fuel pole (−)) A via a fuel pump (not shown). On the other hand, air (atmospheric air) can be sent via an air pump (not shown) to the cathode (air pole (+)) K of the stack S opposite from the anode A.

As the methanol solution is supplied from the fuel cartridge CT to the anode A, methanol and water in the supplied methanol solution react with each other to produce carbon dioxide ($CO_2$), hydrogen ion ($H^+$) and electron ($e^−$) (if expressed by a chemical formula, $CH_3OH+H_2O \rightarrow CO_2+6H^++6e^−$). The carbon dioxide ($CO_2$) is discharged to the outside, while the hydrogen ion ($H^+$) reaches the cathode K through the electrolyte membrane D and the electron ($e^−$) reaches the cathode K via external loads F, such as various circuits, devices etc. of the electronic musical instrument EM, (or via the storage battery D2 in the case where the electronic musical instrument EM is of the hybrid power supply construction). Namely, electric power (voltage/current) is supplied to the external loads F. In the cathode K, the hydrogen ion ($H^+$) reacts with oxygen of introduced atmospheric air while getting the electron ($e^−$) from the surface of the cathode K, to produce water ($H_2O$) (if expressed by a chemical formula, $3/2\ O_2+6H^++6e^− \rightarrow 3H_2O$) that will be discharged to the outside. Arrangements may be made such that the water discharged from the cathode K can be reused as a solvent for diluting the methanol (so as to provided a so-called circulating-type fuel battery).

As set forth above, the electronic musical instrument EM of the present invention employs the above-described fuel battery ED1 as the power supply for driving the various circuits, devices, etc. of the musical instrument EM. Thus, as compared to the conventional electronic musical instruments employing a dry battery or storage battery, the electronic musical instrument EM of the present invention can be used for a long time. Further, if the electronic musical instrument EM employs the fuel battery ED1 in combination with the storage battery ED2 as indicated by a dotted line of FIG. 1 (i.e., if the electronic musical instrument EM is of the hybrid power supply construction), both the fuel battery ED1 and the storage battery ED2 can be used efficiently, so that the electronic musical instrument EM of the present invention can operate (or can be used) for a long time. Namely, if the fuel battery ED1 is used as a charging power supply for charging the storage battery ED2 in such a manner that, when the remaining capacity of the storage battery ED2 has decreased below a predetermined value, activation of the fuel battery ED1 is started to charge the storage battery ED2, but, when the remaining capacity of the storage battery ED2 is greater than a predetermined value, the fuel battery ED1 is kept deactivated, it is possible to eliminate the trouble of detaching/attaching the storage battery ED2 for the purpose of charging the battery ED2 or replacing the battery ED2 with another one of a sufficient remaining capacity. Further, because the fuel consumption by the fuel battery ED1 can be minimized, the fuel cartridge CT too need not be replaced frequently. Further, the fuel cartridge CT can be replaced during the course of a performance by the electronic musical instrument without the performance being interrupted, which is very convenient. Further, in the case where the fuel battery ED1 is used alone, it is not possible to appropriately deal with a situation where the electronic musical instrument temporarily requires a high output from the fuel battery ED1, because the output of the fuel battery ED1 is almost always constant. However, if the electronic musical instrument EM is of the hybrid power supply construction where the fuel battery ED1 is used in combination with the storage battery ED2, it is not possible to meet such a high output requirement, and thus, there can be provided a system capable of appropriately coping with load fluctuation.

Figure 3:
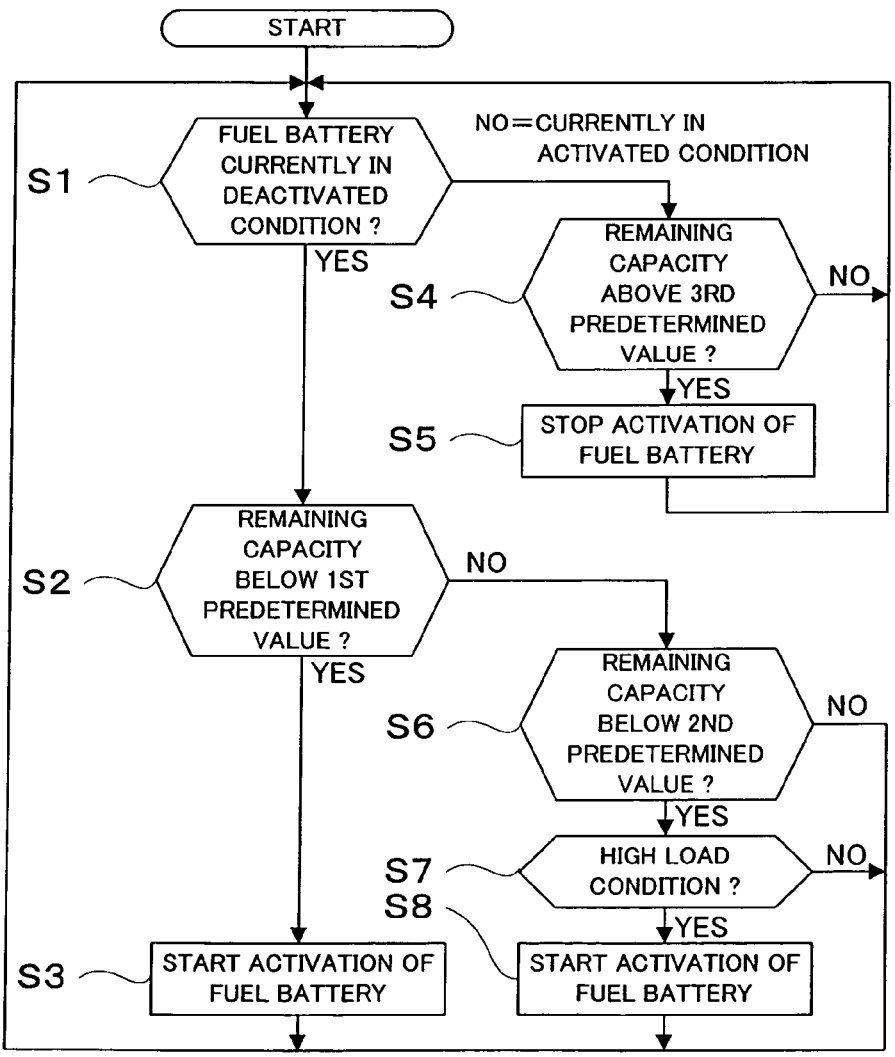
FIG. 3 is a flow chart showing an example operational sequence of a fuel battery control process performed in the embodiment.

The following paragraphs describe a fuel battery control process for controlling the activation of the fuel battery ED1 in the hybrid power supply construction, with reference to FIG. 3. FIG. 3 is a flow chart showing an example operational sequence of the fuel battery control process. In the fuel battery control process, three, i.e. first to third, predetermined values (threshold values) are used for comparison with the current remaining capacity of the storage battery ED2; for example, the first predetermined value represents a 10%-charged state, the second predetermined value represents a 30%-charged state, and the third predetermined value represents a 90%-charged state (see FIG. 4).

At step S1, a determination is made as to whether the fuel battery ED1 is currently in the deactivated condition. If the fuel battery ED1 is not currently in the deactivated condition, i.e. if the fuel battery ED1 is currently activated to charge the storage battery ED2 (NO determination at step S1), a further determination is made, at step S4, as to whether the current remaining capacity of the storage battery ED2 is greater than the third predetermined value (power-generation terminating value). With a YES determination at step S4, the fuel supply to the fuel battery ED1 is stopped to terminate the activation of the fuel battery ED1 and thereby terminate the charging of the storage battery ED2 (step S5). If, on the other hand, the remaining capacity of the storage battery ED2 is not greater than the third predetermined value (NO determination at step S4), the activation of the fuel battery ED1 is continued to keep charging the storage battery ED2. If the fuel battery ED1 is currently in the deactivated condition as determined at step S1 above, i.e. if the fuel battery ED1 is not currently charging the storage battery ED2 (YES determination at step S1), a further determination is made, at step S2, as to whether the remaining capacity of the storage battery ED2 is below the first predetermined value (power-generation starting value). With a YES determination at step S2, the fuel supply to the fuel battery ED1 is started to activate the fuel battery ED1 and thereby start charging the storage battery ED2 (step S3). If, on the other hand, the remaining capacity of the storage battery ED2 is not below the first predetermined value (NO determination at step S2), a further determination is made, at step S6, as to whether the remaining capacity of the storage battery ED2 is below the second predetermined value (power-generation starting value), and a determination is made, at step S7, as to whether a great amount of electric power is being currently supplied to the external loads F (i.e., whether the storage battery ED2 is currently in a high-load condition). If the storage battery ED2 is currently in the high-load condition (YES determination at step S7), the fuel supply to the fuel battery ED1 is started to activate the fuel battery ED1 and thereby start charging the storage battery ED2 (step S8).

Figure 4A:
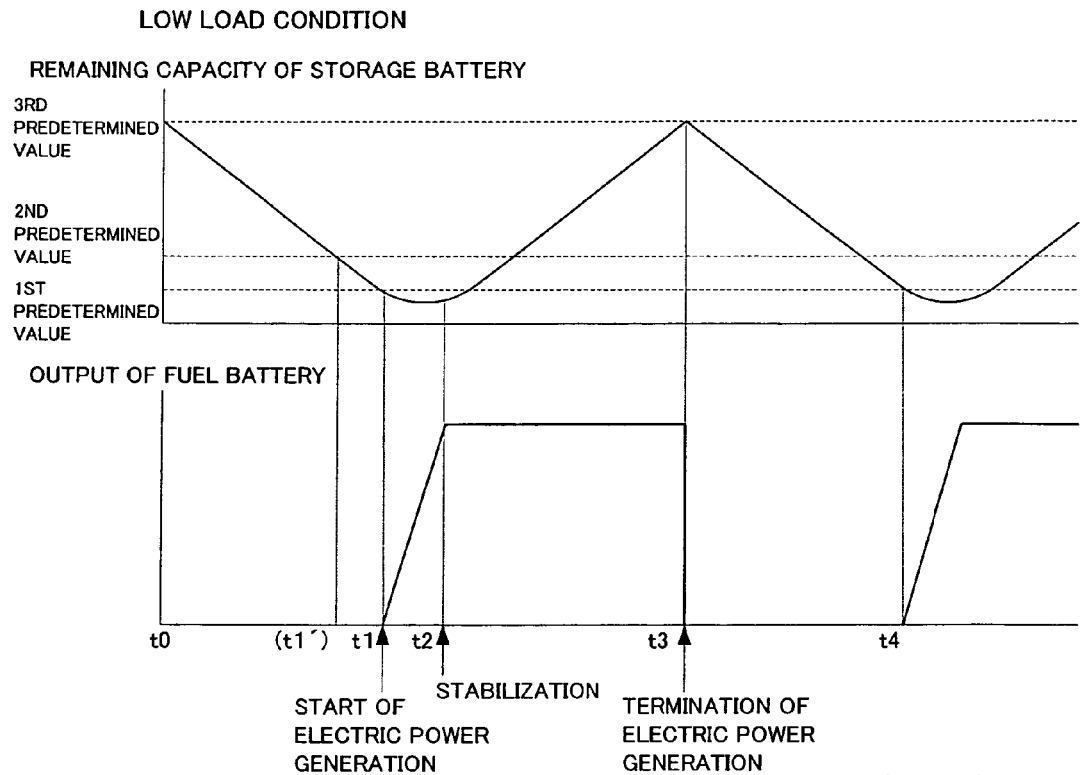
Figure 4B:
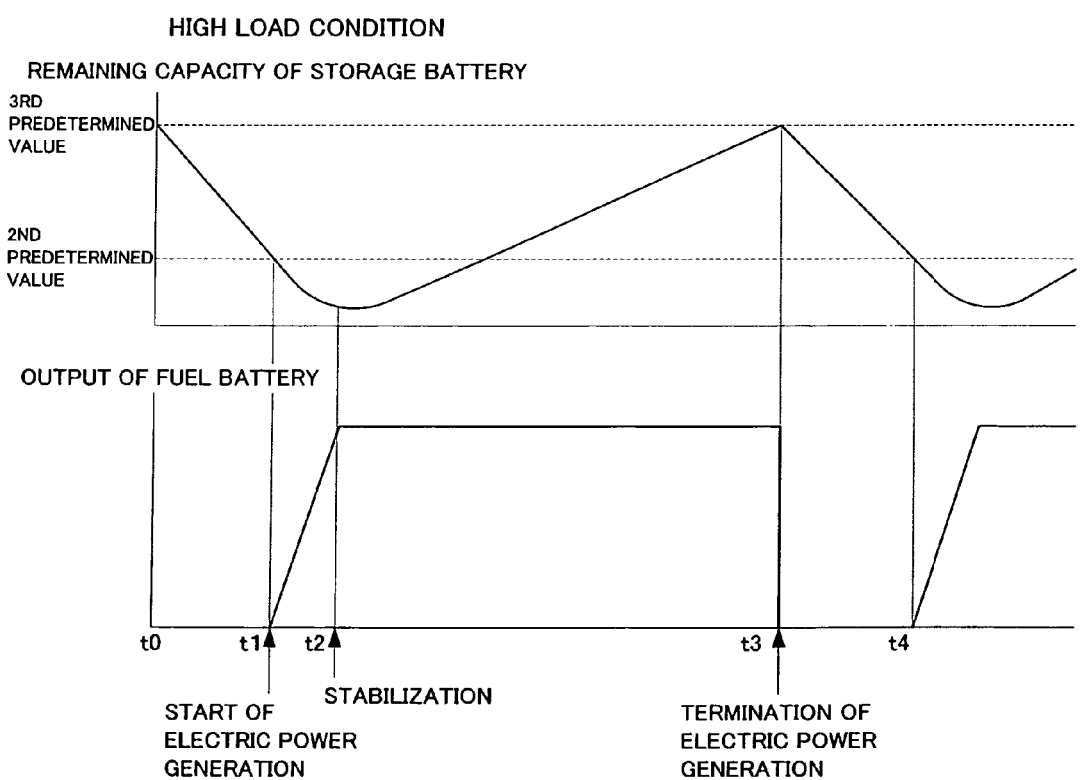

Namely, the "fuel battery control process" is arranged to activate the fuel battery ED1 to charge the storage battery ED2 once the remaining capacity of the storage battery ED2 has decreased below the predetermined value (power-generation starting value) while the external loads F (i.e., various circuits, devices, etc. of the electronic musical instrument EM) are being driven on the basis of the discharge of the storage battery ED2. Further, in the fuel battery control process, the predetermined value (power-generation starting value) to be used as the threshold value for activating the fuel battery ED1 is varied in accordance with the condition of the external loads F. Namely, in the low load condition where a small number of circuits, devices, etc. are being driven, the first predetermined value is used as the threshold value for activating the fuel battery ED1, while, in the high load condition where a great number of circuits, devices, etc. are being driven, the second predetermined value greater than the first predetermined value is used as the threshold value. Now, the start and termination of the activation of the fuel battery ED1 based on the above-described "fuel battery control process" of FIG. 3 will be described below in relation to specific examples. FIGS. 4A and 4B are diagram showing examples of relationship between variations in the remaining capacity of the storage battery ED2 and the output electric power of the fuel battery ED1. More specifically, FIG. 4A shows the relationship in the low load condition where the amount of the power supply to the external loads F is small, while FIG. 4B shows the relationship in the high load condition where the amount of the power supply to the external loads F is great. In both of FIGS. 4A and 4B, the horizontal axis represents the time. In FIG. 4A, the vertical axis represents the remaining capacity (%) of the storage battery ED2, but, in FIG. 4B, the vertical axis represents the output power (watt or W) of the fuel battery ED1.

First, the relationship between variations in the remaining capacity of the storage battery ED2 in the low load condition and the output electric power of the fuel battery ED1 is explained with reference to FIG. 4A. Upon powering-on of the storage battery ED2 at time point t0, electric power is supplied from the storage battery ED2 to the circuits, devices, etc. constituting the electronic musical instrument. During a period from time point t0 to time point t1, the fuel battery ED1 is kept deactivated so that no electric power is supplied to the storage battery ED2, and thus, the remaining capacity of the storage battery ED2 decreases as the circuits, devices, etc. of the electronic musical instrument consume electric power. Once the remaining capacity of the storage battery ED2 has decreased below the first predetermined value at time point t1, the fuel battery ED1 is activated ("start of electric power generation" in the figure) so that electric power is supplied from the fuel battery ED1 to the storage battery ED2 (step S3). In general, it takes a certain amount of time before the output of the fuel battery ED1 stabilizes after activation of the fuel battery ED1. Thus, for some time following the activation of the fuel battery ED1 (for a time period from time point t1 to time point t2), the remaining capacity of the storage battery ED2 continues to decrease without the storage battery ED2 being charged. Because the remaining capacity of the storage battery ED2 decreases at a low rate in the low load condition, the remaining capacity decrease during the time period from the activation of the fuel battery ED1 to the start of the charging of the storage battery ED2 in the low load condition can be small as compared to that in the high load condition. Thus, while the storage battery ED2 is in the low load condition, the fuel battery ED1 is not activated even when the remaining capacity of the storage battery ED2 has decreased below the second predetermined value; in this case, even if the fuel battery ED1 is activated to charge the storage battery ED2 only when the remaining capacity has decreased considerably (e.g., decreased to the first predetermined value or below), the remaining capacity of the storage battery ED2 can be prevented from becoming zero within the time period necessary for the activation of the fuel battery ED1, so that the circuits, devices, etc. can be driven appropriately with no particular problem.

After the output of the fuel battery ED1 stabilizes at time point t2 ("stabilization" in the figure), and when the storage battery ED2 is in the low load condition, the power output from the fuel battery ED1 does not become lower than the consumed electric power of all of the external loads, so that the storage battery ED2 can be gradually charged to increase its remaining power (from time point t2 to time point t3). Then, once the remaining capacity of the storage battery ED2 exceeds the third predetermined value at time point t3, the activation of the fuel battery ED1 is terminated to terminate the electric power supply to the storage battery ED2 (see "termination of electric power generation" in the figure and step S5 of FIG. 3). Following time point t3, control similar to that performed following time point t0 is performed repetitively on the fuel battery ED1 in accordance with the remaining capacity of the storage battery ED2.

Next, the relationship between the remaining capacity of the storage battery ED2 in the high load condition and the output electric power of the fuel battery ED1 is explained with reference to FIG. 4B. Upon powering-on of the storage battery ED2 at time point t0, electric power is supplied from the storage battery ED2 to the circuits, devices, etc. constituting the electronic musical instrument. During a period from time point t0 to time point t1, the fuel battery ED1 is kept deactivated so that no electric power is supplied to the storage battery ED2, and thus, the remaining capacity of the storage battery ED2 decreases as the circuits, devices, etc. of the electronic musical instrument consume electric power. However, the remaining capacity of the storage battery ED2 in the high load condition decreases at a higher rate than that in the low load condition. Once the remaining capacity of the storage battery ED2 has decreased below the second predetermined value at time point t1, the fuel battery ED1 is activated ("start of electric power generation" in the figure) so that electric power is supplied from the fuel battery ED1 to the storage battery ED2 (step S7). As noted above, it takes a certain amount of time before the output of the fuel battery ED1 stabilizes after the activation of the fuel battery ED1. Thus, for some time following the activation of the fuel battery ED1 (for a time period from time point t1 to time point t2), the remaining capacity of the storage battery ED2 continues to decrease without the storage battery ED2 being charged. In the low load condition, the remaining capacity of the storage battery ED2 decreases at a low rate and thus the remaining capacity decrease during the time period from the activation of the fuel battery ED1 to the start of the charging of the storage battery ED2 in the low load condition can be made small, as noted above. However, in the high load condition, the remaining capacity of the storage battery ED2 decreases rapidly as compared to that in the low load condition, so that the decrease in the remaining capacity till the start of the charging is much greater. Thus, in the high load condition, the fuel battery ED1 is activated once the remaining capacity of the storage battery ED2 decreases below the second predetermined value greater than the first predetermined value, so as to prevent the remaining capacity of the storage battery ED2 from becoming zero as the circuits, devices, etc. consume electric power and thereby prevent the driving of the circuits, devices, etc. from being undesirably ceased (i.e. prevent the performance by the electronic musical instrument from being undesirably stopped). Further, in the high load condition, even the stable output of the fuel battery ED1 may fail to overtake the electric power to be supplied to the storage battery ED2 and thus the storage battery ED2 may not be appropriately charged (namely, the power consumed by the loads>the output power from the fuel battery ED1), depending on the necessary power supply to the external loads F. Thus, activating the fuel battery ED1 once the remaining capacity of the storage battery ED2 decreases below the second predetermined value as noted above is significant with a view to gaining time before the remaining capacity becomes zero and waiting for the necessary power supply to the external loads F to become small enough. Further, because the storage battery generally has a characteristic that its deterioration would quicken as the number of charging and discharging increases, it is desirable that the number of charging and discharging be minimized. Further, depending on the type of the storage battery ED2, the remaining capacity of the storage battery ED2 may decrease due to a "memory effect" if charging of the storage battery ED2 is initiated with a considerable remaining capacity still present in the storage battery ED2. For these reasons, the storage battery ED2 in the instant embodiment is caused to discharge only when the remaining capacity has decreased to a considerably-small value.

After the output of the fuel battery ED1 stabilizes at time point t2 ("stabilization" in the figure), and while the output power from the fuel battery ED1 is greater than the consumed electric power of all of the external loads, the storage battery ED2 can be gradually charged to increase its remaining power (from time point t2 to time point t3); however, unlike in the low load condition, the remaining capacity of the storage battery ED2 increases at a low rate in the high load condition. Then, once the remaining capacity of the storage battery ED2 exceeds the third predetermined value at time point t3, the activation of the fuel battery ED1 is terminated to terminate the electric power supply to the storage battery ED2 (see "termination of electric power generation" in the figure and step S5 of FIG. 3). Following time point t3, control similar to that performed following time point t0 is performed repetitively on the fuel battery ED1 in accordance with the remaining capacity of the storage battery ED2.

In the embodiment of the present invention as described above, the storage battery ED2 is charged with electric power supply from the fuel battery ED1, and the electronic musical instrument EM is driven by the thus-charged storage battery ED2. During that time, the remaining capacity of the storage battery is compared to the three predetermined values (threshold values), and the activation and deactivation of the fuel battery ED1 is controlled in accordance with the comparison results. In this way, the instant embodiment can appropriately cope with rapid variations in the consumed power of the external loads F due to, for example, an increase in the tone volume, increase in the number of simultaneously-generated tones, simultaneous operation of many performance operators, execution of an automatic performance, driving of the external storage device 10, etc. Further, once the remaining capacity of the storage battery ED2 decreases below a predetermined value, the fuel is supplied to the fuel battery ED1 to generate electric power for charging the storage battery ED2, but, once the remaining capacity of the storage battery ED2 increases above a predetermined value, the fuel supply to the fuel battery ED1 is terminated to shift the charging operation to the discharging operation. In this way, the instant embodiment can not only minimize the fuel consumption but also minimize deterioration of the storage battery ED2. Further, in the instant embodiment, the predetermined value to be used as the threshold value for starting the electric power generation by the fuel battery ED1 is varied in accordance with the current condition of the external loads F (i.e., low load condition or high load condition). More specifically, in the high load condition where the necessary power supply to the external loads F is great, the predetermined value (threshold value) is increased as compared to the predetermined value (threshold value) used in the low load condition. Thus, the instant embodiment can prevent the remaining capacity of the storage battery ED2 from undesirably running out during the time period from the start of electric power generation by the fuel battery ED1 to the stabilization of the generated electric power.

Note that the storage battery (secondary battery) ED2 to be used together with the fuel battery ED1 in the hybrid power supply construction may be any desired type of battery, such as a nickel-cadmium, nickel-hydrogen or lithium ion type.

Further, the current condition of the external loads F (i.e., low load condition or high load condition) may be detected in any desired manner, e.g., on the basis of a decrease rate of the remaining capacity of the storage battery ED2, on the basis of a tone volume setting of the electronic musical instrument EM or on the basis of the number of tones simultaneously generatable by the electronic musical instrument EM. Alternatively, the current condition of the external loads F may be detected comprehensively on the basis of a combination of a plurality of such detecting schemes.

Further, the activation control performed on the fuel battery ED1 is not limited to the one for placing the fuel battery ED1 in any one of the two states, i.e. whether the fuel should be supplied or not. For example, the control performed on the fuel battery ED1 may be control for placing the fuel battery ED1 in any one of three states: a state in which a great amount of fuel should be supplied, a state in which a small amount of fuel should be supplied; and a state in which no fuel should be supplied; for example, the control may be performed on the fuel battery ED1 such that a small amount of fuel is supplied in the low load condition and a great amount of fuel is supplied in the high load condition so that the output power value is varied in accordance with the load condition.

Furthermore, the present invention is not limited to the construction where the output from the fuel battery ED1 is supplied to the storage battery ED2 alone only for the purpose of charging the storage battery ED2; namely, the output from the fuel battery ED1 may be used for driving the external loads F, and the remainder of the output from the fuel battery ED1 may be used to charge the storage battery ED2.

What is claimed is:

1. An electronic musical instrument comprising:
   a performance operator unit;
   a tone generation section that includes a plurality of electrically-operable circuits/devices and generates a tone by any of the circuits/devices operating in response to operation of said performance operator unit; and
   a fuel battery that generates electric power using a predetermined fuel, activation and deactivation of electric power generation by said fuel battery being capable of being controlled in accordance with whether or not the fuel should be supplied to said fuel battery, said fuel battery allowing the circuits/devices to electrically operate by supplying the electric power to individual ones of the circuits/devices of said tone generation section.

2. An electronic musical instrument as claimed in claim 1 which further comprises a chargeable secondary battery that supplies electric power to the individual circuits/devices of said tone generation section, and wherein said fuel battery supplies said secondary battery with charging electric power.

3. An electronic musical instrument as claimed in claim 2 which further comprises a control section that, when a remaining capacity of said secondary battery has decreased below a predetermined starting value, performs control to supply the fuel to said fuel battery to thereby start the electric power generation for charging said secondary battery, and that, when the remaining capacity of said secondary battery has increased above a predetermined terminating value, performs control to stop supply of the fuel to said fuel battery to thereby stop the electric power generation for terminating charging of said secondary battery.

4. An electronic musical instrument as claimed in claim 3 wherein whether or not the fuel should be supplied to said fuel battery is controlled using the starting value that is variable in accordance with a load condition of said secondary battery driving the circuits/devices.

* * * * *